(12) United States Patent
Leng

(10) Patent No.: US 10,631,685 B2
(45) Date of Patent: Apr. 28, 2020

(54) TOASTER

(71) Applicant: Dongguan Tangxia Nyhang Electrical Co., Ltd., Dongguan (CN)

(72) Inventor: Xiaoping Leng, Dongguan (CN)

(73) Assignee: DONGGUAN TANGXIA NYHANG ELECTRICAL CO., LTD., Dongguan, Guangdong (CN)

( * ) Notice: Subject to any disclaimer, the term of this patent is extended or adjusted under 35 U.S.C. 154(b) by 379 days.

(21) Appl. No.: 15/691,766

(22) Filed: Aug. 31, 2017

(65) Prior Publication Data

US 2019/0059653 A1 Feb. 28, 2019

(51) Int. Cl.
*A47J 37/08* (2006.01)

(52) U.S. Cl.
CPC .................... *A47J 37/08* (2013.01)

(58) Field of Classification Search
CPC .... A47J 37/08; A47J 37/0807; A47J 37/0814; A47J 37/0821; A47J 37/0857; A47J 37/0871
USPC ........ 99/325, 327, 329 R, 329 RT, 331, 385, 99/386, 389, 390–393, 400, 423
See application file for complete search history.

(56) References Cited

U.S. PATENT DOCUMENTS

| | | | | |
|---|---|---|---|---|
| 3,800,691 A | * | 4/1974 | Eaton, Jr. ............ | A47J 37/0623 99/391 |
| 5,522,306 A | * | 6/1996 | DeMars .............. | A47J 37/0871 99/329 RT |
| 6,116,148 A | * | 9/2000 | Allen .................. | A47J 37/0842 99/329 RT |
| 2002/0113054 A1 | * | 8/2002 | Arel ..................... | A47J 37/0857 99/327 |
| 2011/0067578 A1 | * | 3/2011 | Volatier .............. | A47J 37/0814 99/385 |

* cited by examiner

*Primary Examiner* — Hung D Nguyen
(74) *Attorney, Agent, or Firm* — Leong C. Lei

(57) ABSTRACT

A toaster includes a housing having a toasting chamber therein. An upper end of the toasting chamber has an inlet for feeding sliced bread. A lower end of the toasting chamber has an outlet for discharging the sliced bread. The outlet is provided with a door for opening and closing the outlet. The door is driven by a door opening structure. The door opening structure includes a door locking mechanism, a lift door opening mechanism, a magnetic suction mechanism, a power switch mechanism, and a PCB control board.

8 Claims, 18 Drawing Sheets

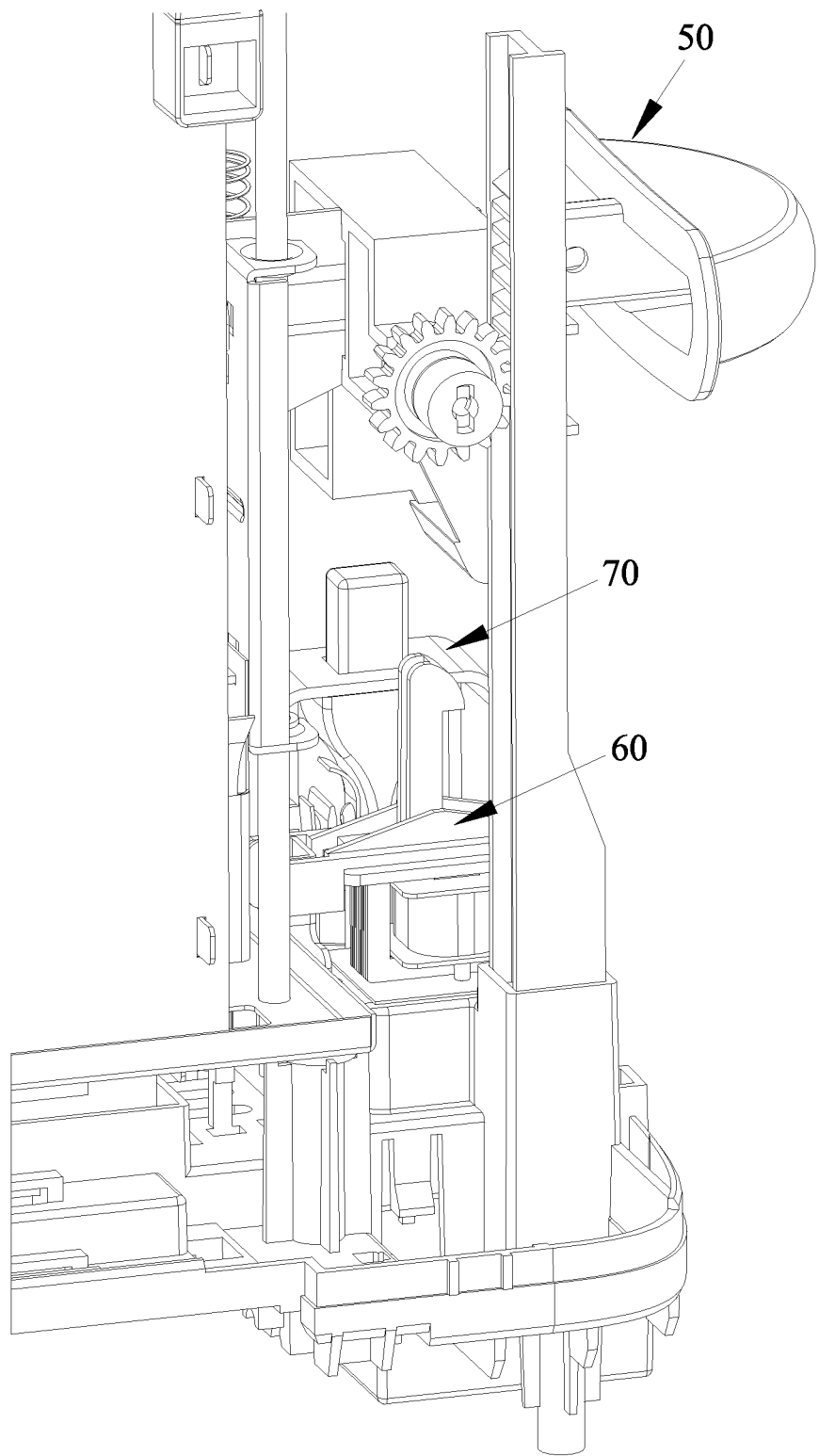
F I G. 9

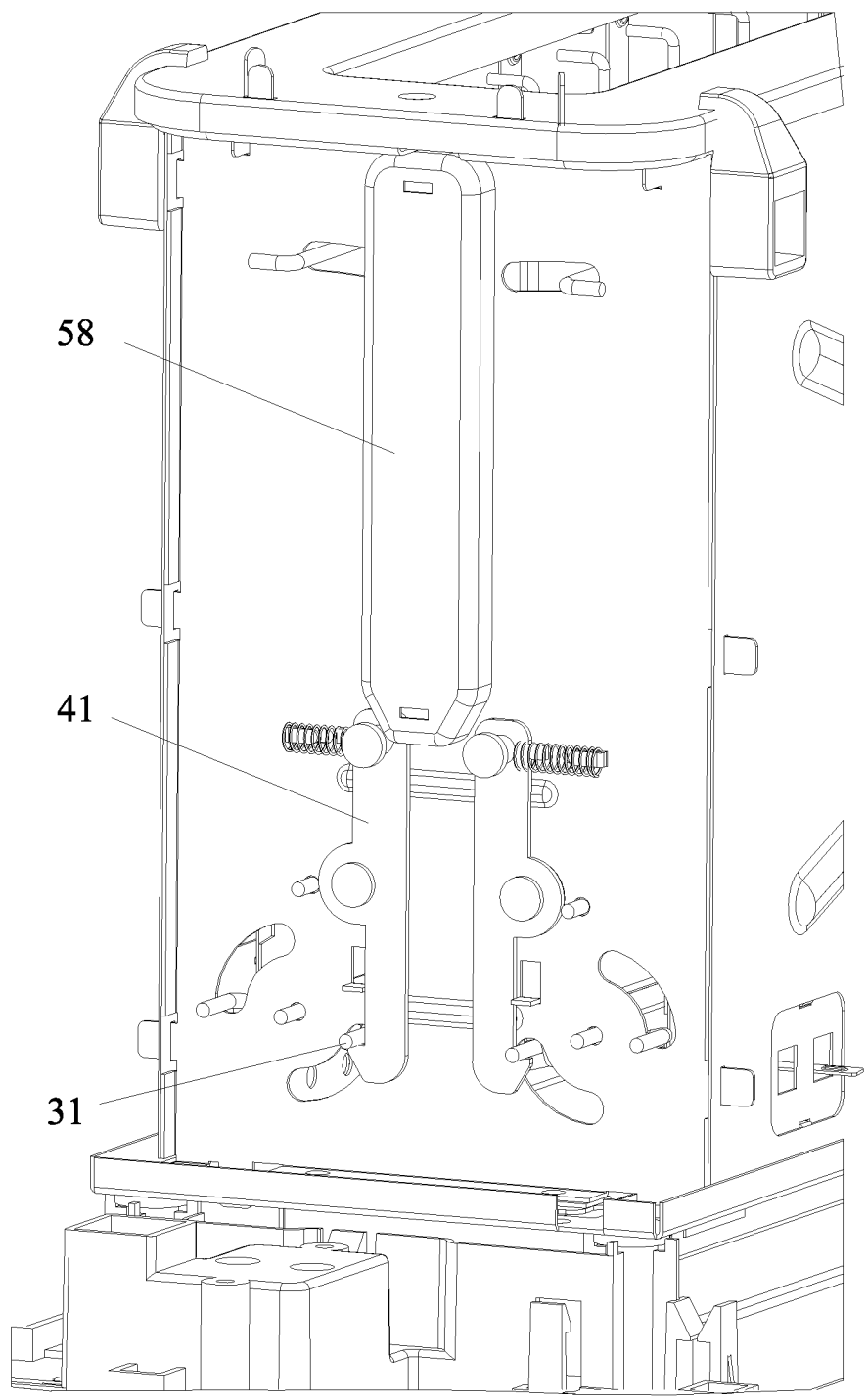
F I G. 10

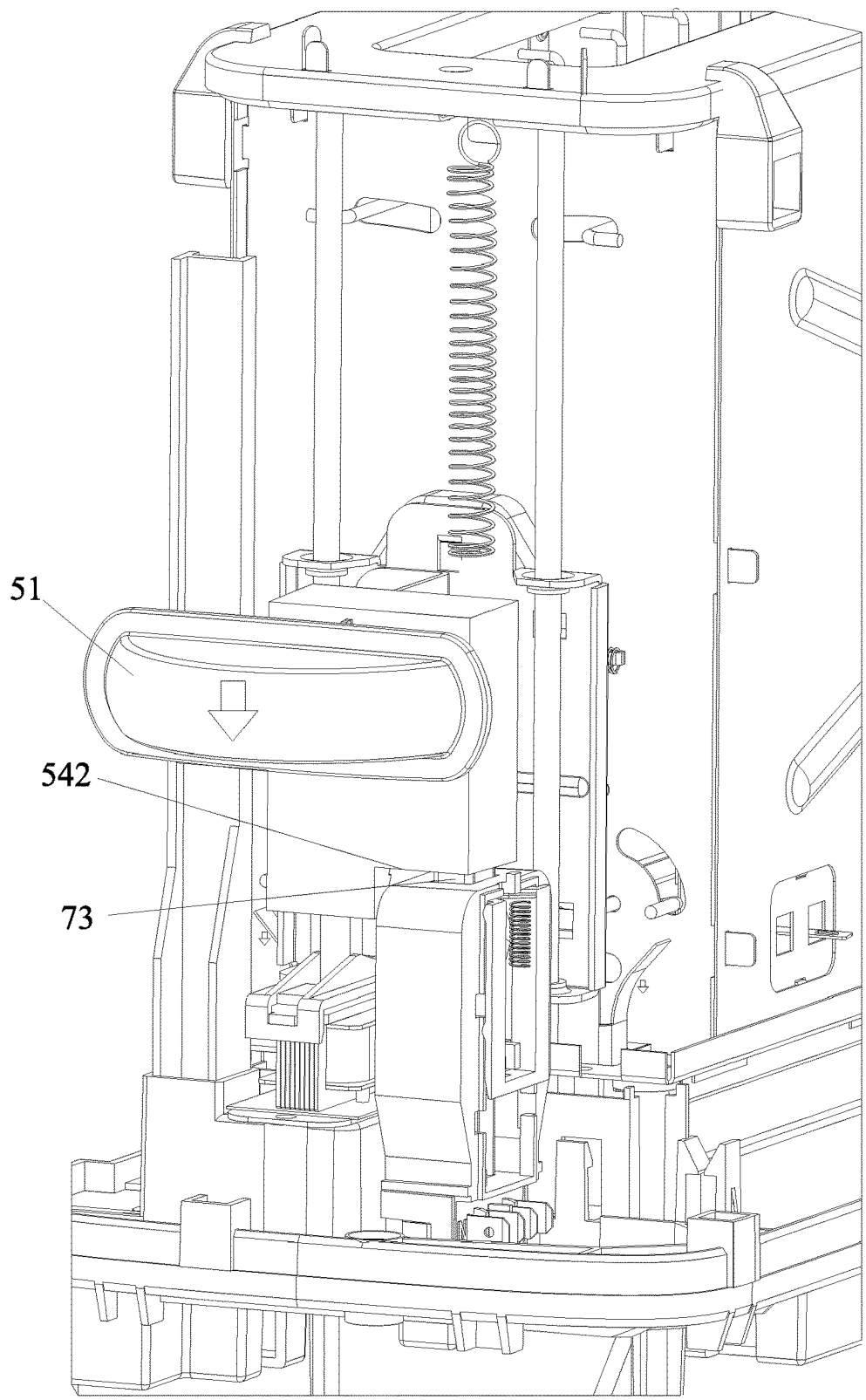
F I G. 15

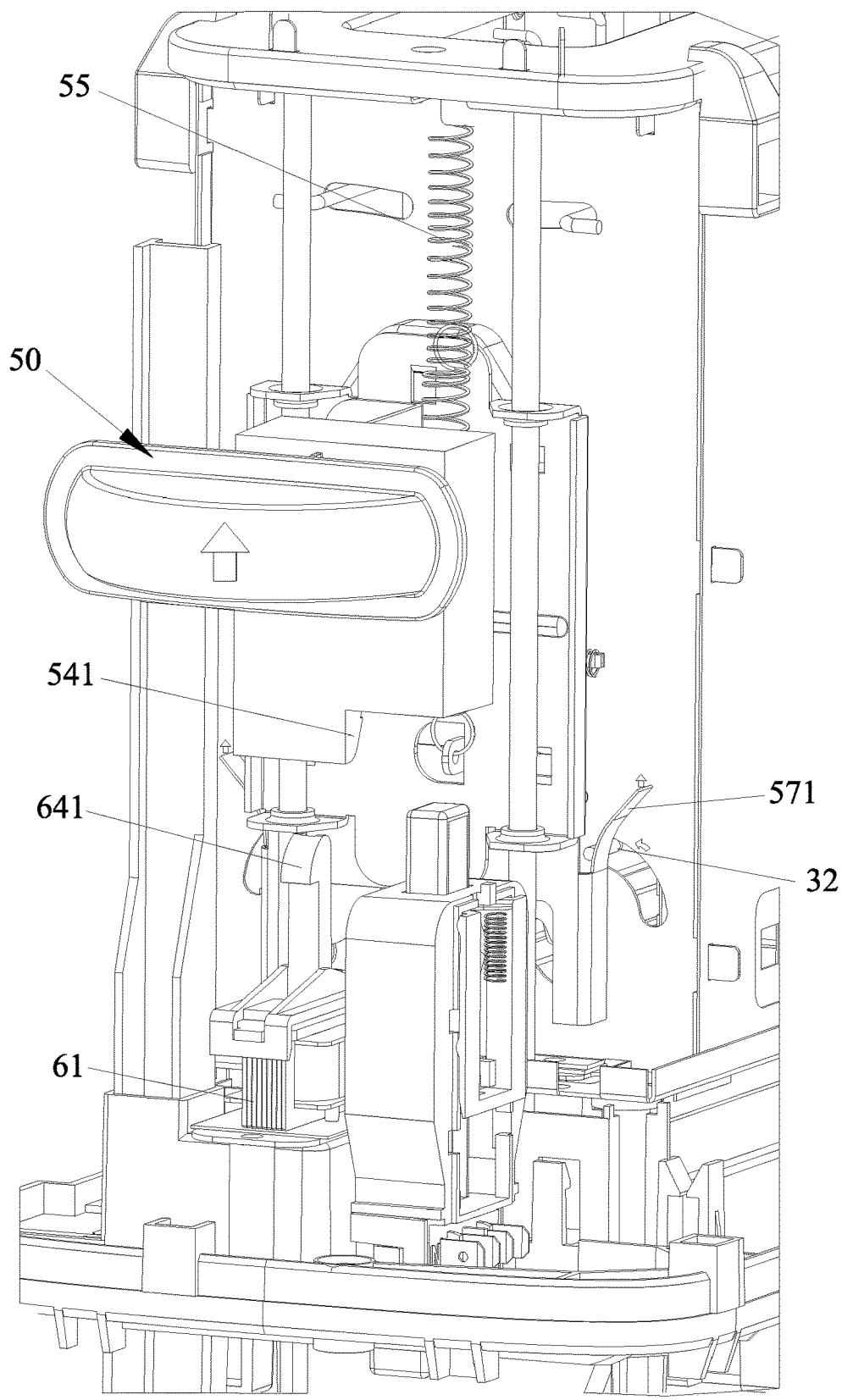
F I G. 17

TOASTER

BACKGROUND OF THE INVENTION

1. Field of the Invention

The present invention relates to a toaster, and more particularly to a toaster able to automatically discharge sliced bread after toasting.

2. Description of the Prior Art

A conventional toaster comprises a base, a housing, a toasting chamber, a timing device, a bread lift mechanism, a button, and a function display device. In general, the toasting chamber has an opening facing upward, and the bottom of the toasting chamber is closed. When in use, sliced bread is placed into the toaster from the opening. After toasting, the sliced bread is taken out with the user's hand to achieve a complete heating process.

This toaster has the following defects:
1. Bread crumbs fall to the bottom of the toasting chamber easily. After a long period of use, the bottom of the toaster is accumulated with a large number of bread crumbs. If the bread crumbs are not promptly cleaned up, it is prone to fire in high temperature baking conditions. It is not safe for use.
2. For cleaning up the bread crumbs, it is necessary to turn the whole toaster upside down and shake, so that the bread crumbs come out from the opening at the top of the toaster. The cleaning is somewhat trouble.
3. Even if the toaster is cleaned frequently, it is unable to ensure that all the bread crumbs come out. When the toaster is not use, it is easy to attract cockroaches or mice to enter the internal of the toaster, causing pollution and affecting health. Therefore, this conventional toaster cannot meet the needs of consumers.

SUMMARY OF THE INVENTION

In view of the shortcomings of the prior art, the primary object of the present invention is to provide a toaster when can automatically open a door after toasting sliced bread so that the sliced bread is discharged on a bread tray to overcome the shortcomings of the prior art.

In order to achieve the aforesaid object, the toaster of the present invention comprises a housing having a toasting chamber disposed in the housing. An upper end of the toasting chamber has an inlet for feeding sliced bread. A lower end of the toasting chamber has an outlet for discharging the sliced bread. The outlet is provided with a door for opening and closing the outlet. The door is driven by a door opening structure. The door opening structure includes a door locking mechanism, a lift door opening mechanism, a magnetic suction mechanism, a power switch mechanism, and a PCB control board. The lift door opening mechanism is slidably mounted on an outside of the toasting chamber. The magnetic suction mechanism and the power switch mechanism are located under the lift door opening mechanism. The PCB control board is electrically connected with the magnetic suction mechanism. When the lift door opening mechanism is pressed down, the door locking mechanism is disengaged from a door locking shaft and the power switch mechanism is activated for energizing. The magnetic suction mechanism is energized to engage with the lift door opening mechanism until the baking of the sliced bread is finished. The PCB control board controls the magnetic suction mechanism to be de-energized when the lift door opening mechanism automatically rises to pull a door opening shaft to open the door.

The present invention has obvious advantages and beneficial effected as compared with the prior art. Specifically, it is understood from the above-mentioned technical solution that the door at the outlet of the toasting chamber is provided with the door opening structure. The door opening structure includes the door locking mechanism, the lift door opening mechanism, the magnetic suction mechanism, the power switch mechanism, and the PCB control board. When the lift door opening mechanism is pressed to the lowermost to disengage the door locking mechanism from the door locking shaft, the power switch mechanism is activated so that the toaster starts to toast sliced bread, and the magnetic suction mechanism is energized to engage with the lift door opening mechanism until the baking of the sliced bread is finished, and the PCB control board controls the magnetic suction mechanism to be de-energized when the lift door opening mechanism automatically rises to pull the door opening shaft to open the door. This control way is simple. The lift door opening mechanism is pressed to drive many components, including the connection of the power to start baking and unlocking the latch, so that the magnetic suction mechanism is energized to engage with the lift door opening mechanism. After de-energized, the lift door opening mechanism slowly rises to push the door opening shaft to open the door. There is no need for power control. This way is energy-saving and environment-friendly.

BRIEF DESCRIPTION OF THE DRAWINGS

FIG. 9 is a schematic view in accordance with an embodiment of the present invention, showing the lift door opening mechanism and the magnetic suction mechanism before energized;

FIG. 10 is a schematic view in accordance with an embodiment of the present invention, showing the door locking mechanism before energized;

FIG. 15 is a schematic view in accordance with an embodiment of the present invention, showing that the lift door opening mechanism is pressed to the lowermost;

FIG. 17 is a schematic view in accordance with an embodiment of the present invention, showing that after the magnetic suction mechanism is de-energized, the leaf spring pushes the door opening shaft when the lift door opening mechanism rises;

DETAILED DESCRIPTION OF THE PREFERRED EMBODIMENTS

Embodiments of the present invention will now be described, by way of example only, with reference to the accompanying drawings.

Figure 1:
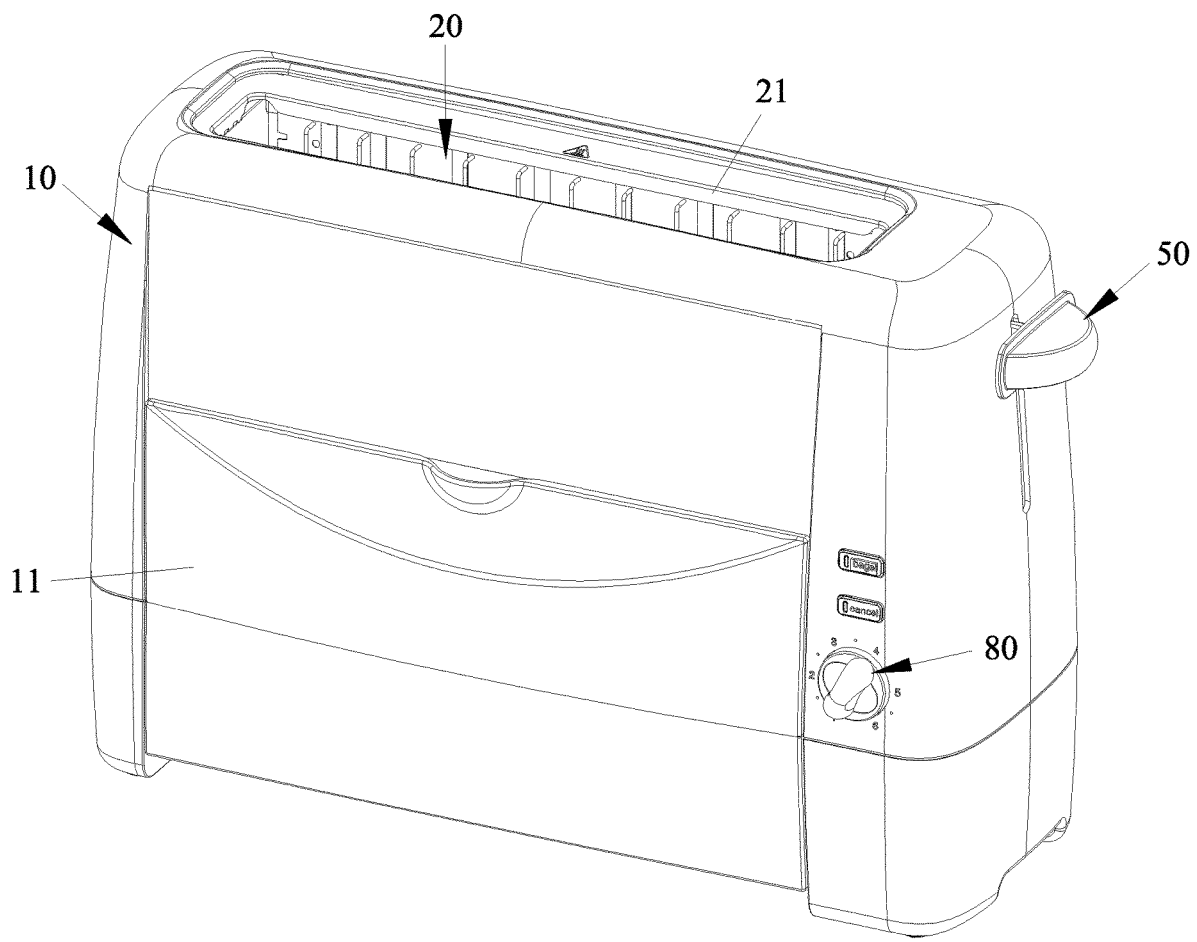
FIG. 1 is a perspective view in accordance with an embodiment of the present invention, showing the bread tray of the toaster in a closed state.
Figure 2:
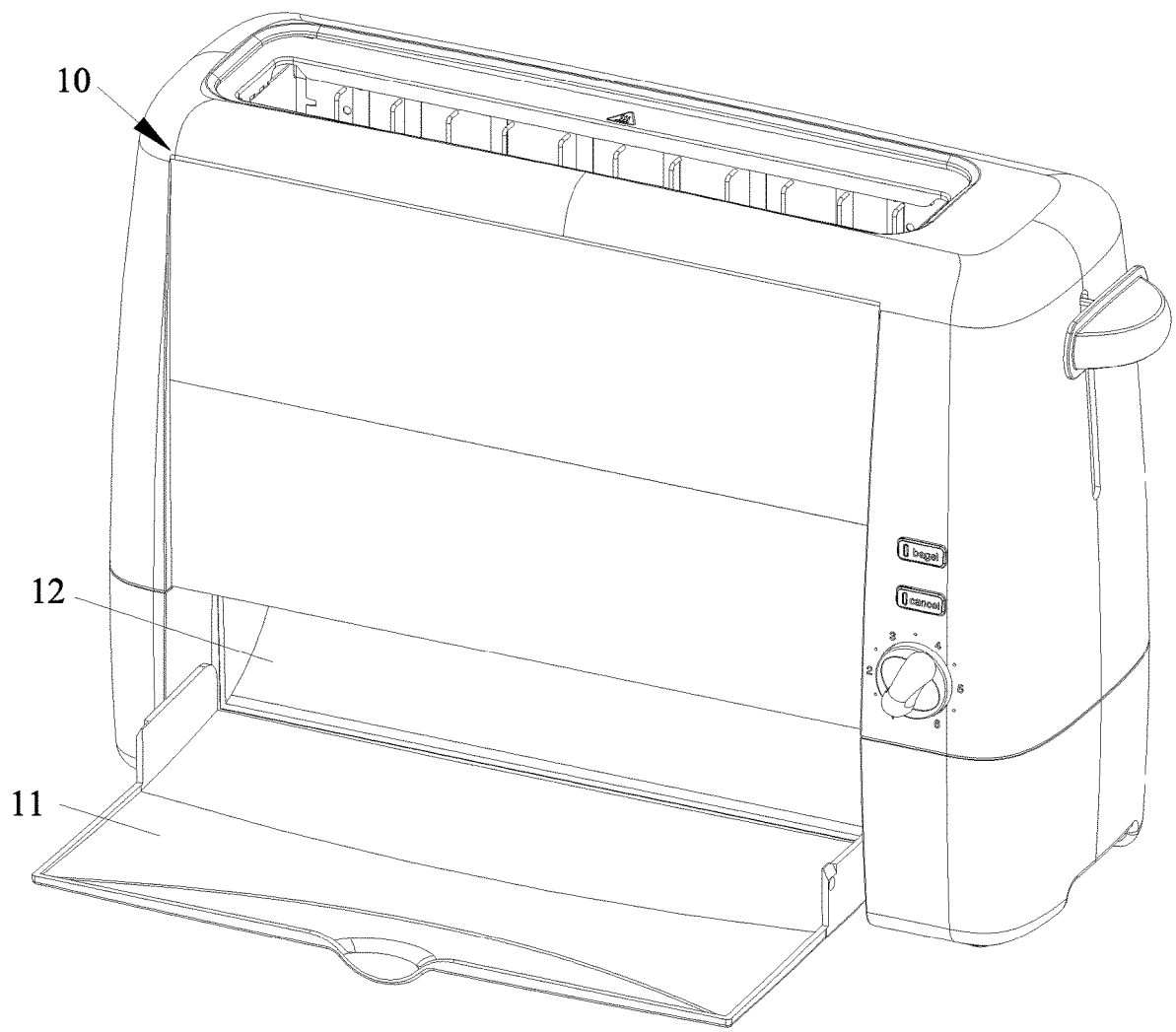
FIG. 2 is a perspective view in accordance with an embodiment of the present invention, showing the bread tray of the toaster in an open state.
Figure 3:
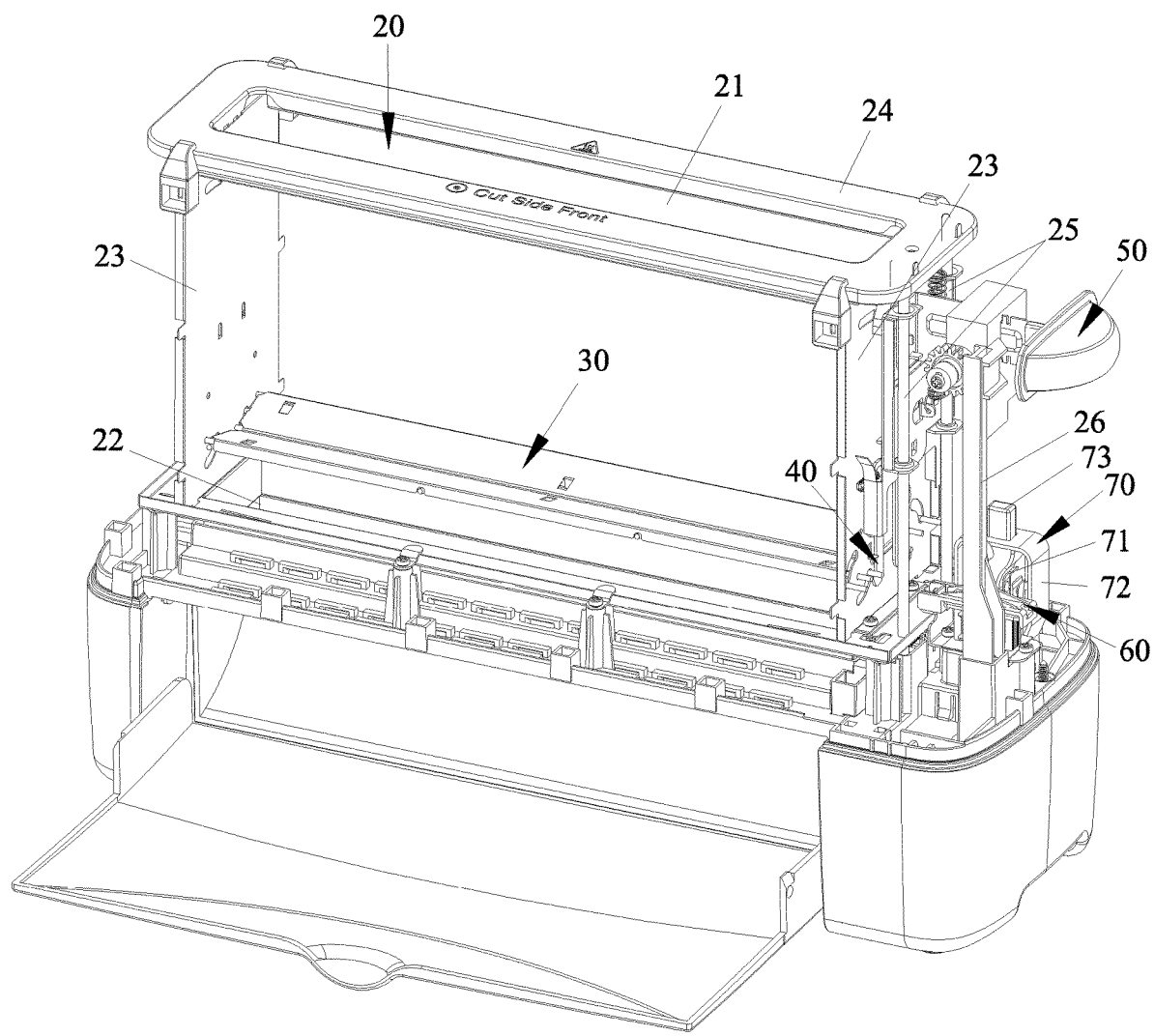
FIG. 3 is a schematic view in accordance with an embodiment of the present invention, showing the door opening structure of the toaster.

As shown in FIG. 1 to FIG. 3, a toaster in accordance with a preferred embodiment of the present invention comprises a housing 10 having a toasting chamber 20 disposed in the housing 10. An upper end of the toasting chamber 20 has an inlet 21 for feeding sliced bread, and a lower end of the toasting chamber 20 has an outlet 22 for discharging the sliced bread. A front side of the housing 10 is rotatably mounted with a bread tray 11. The bread tray 11 is connected with the outlet 22 of the toasting chamber 20 through a guide plate 12. When used, the bread tray 11 is opened by hand, and the bread is discharged on the bread tray 11. When not used, the bread tray 11 closes the outlet 22. In this way, the bread and crumbs drops from the outlet 22 onto the bread tray 11, and the crumbs do not accumulate inside the toaster. The safety and hygiene of use are improved, and it is convenient to clean the toaster.

In order to prevent the bread from dropping from the toasting chamber 20 during toasting, the outlet 22 is provided with a door 30 for opening and closing the outlet 22. The door 30 is driven by a door opening structure. The door opening structure includes a door locking mechanism 40, a lift door opening mechanism 50, a magnetic suction mechanism 60, a power switch mechanism 70, and a PCB control board. The lift door opening mechanism 50 is slidably mounted on the outside of the toasting chamber 20. The magnetic suction mechanism 60 and the power switch mechanism 70 are located under the lift door opening mechanism 50. The PCB control board is electrically connected with the magnetic suction mechanism 60 and a timer knob 80. When the lift door opening mechanism 50 is pressed down, the door locking mechanism 40 is disengaged from a door locking shaft 31 and the power switch mechanism 70 is activated for energizing. The magnetic suction mechanism 60 is energized to engage with the lift door opening mechanism 50 until the baking of the bread is finished. The PCB control board controls the magnetic suction mechanism 60 to be de-energized when the lift door opening mechanism 50 automatically rises to pull a door opening shaft 32 to open the door 30.

Figure 4:
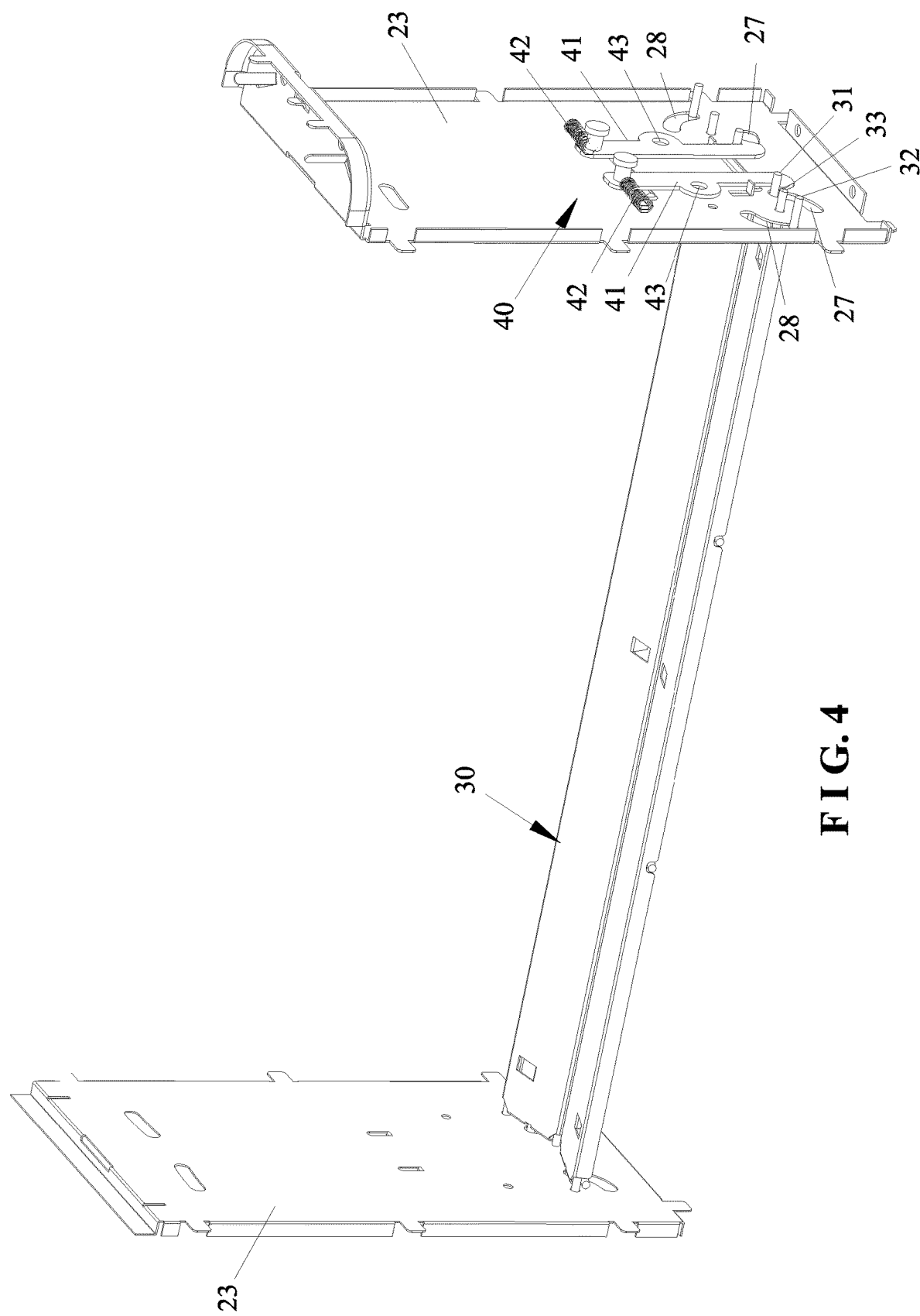
FIG. 4 is a schematic view in accordance with an embodiment of the present invention, showing the door and the door locking mechanism of the toaster.
Figure 11:
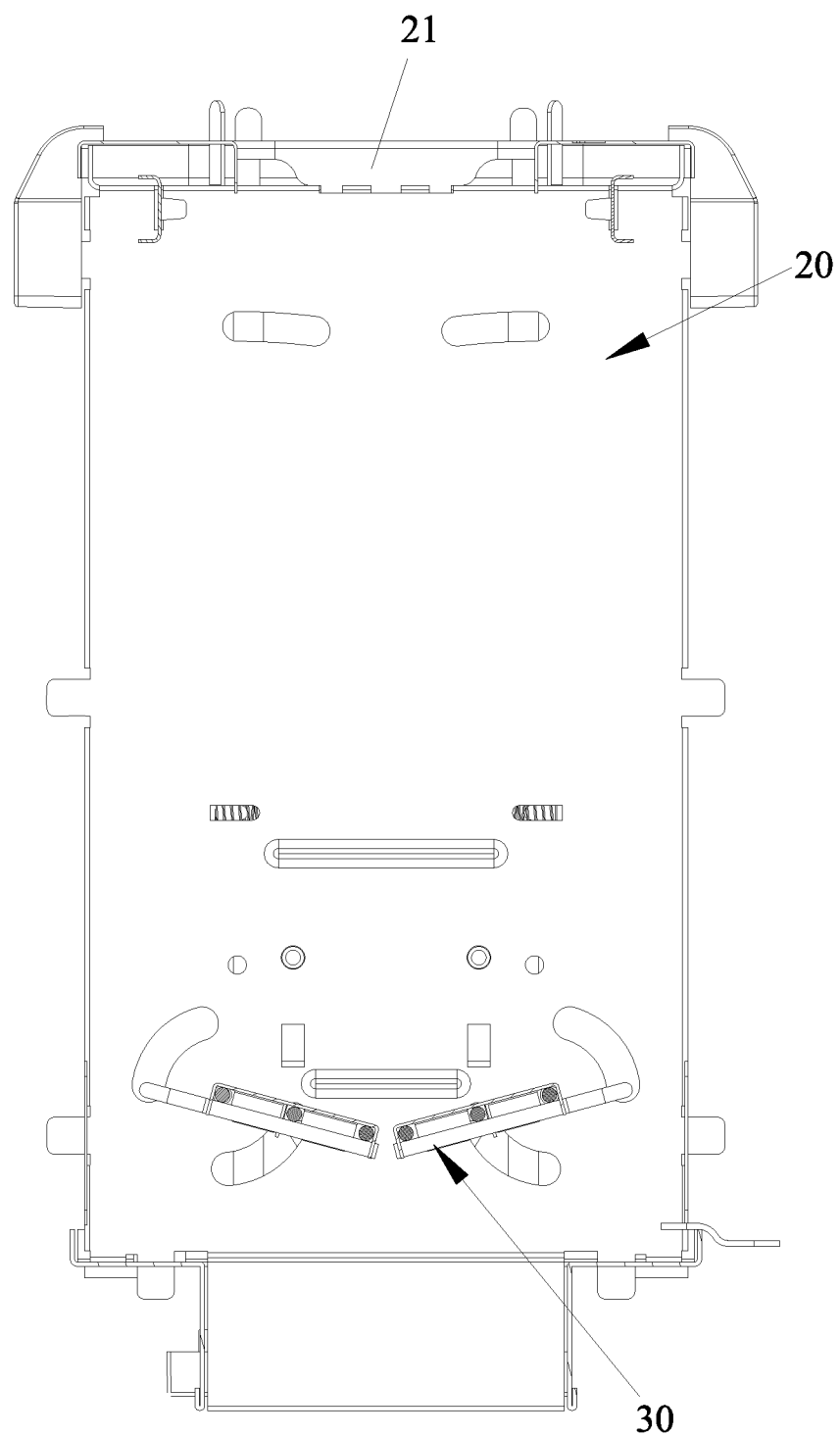
FIG. 11 is a schematic view in accordance with an embodiment of the present invention, showing the door before energized (in a closed state)
Figure 18:
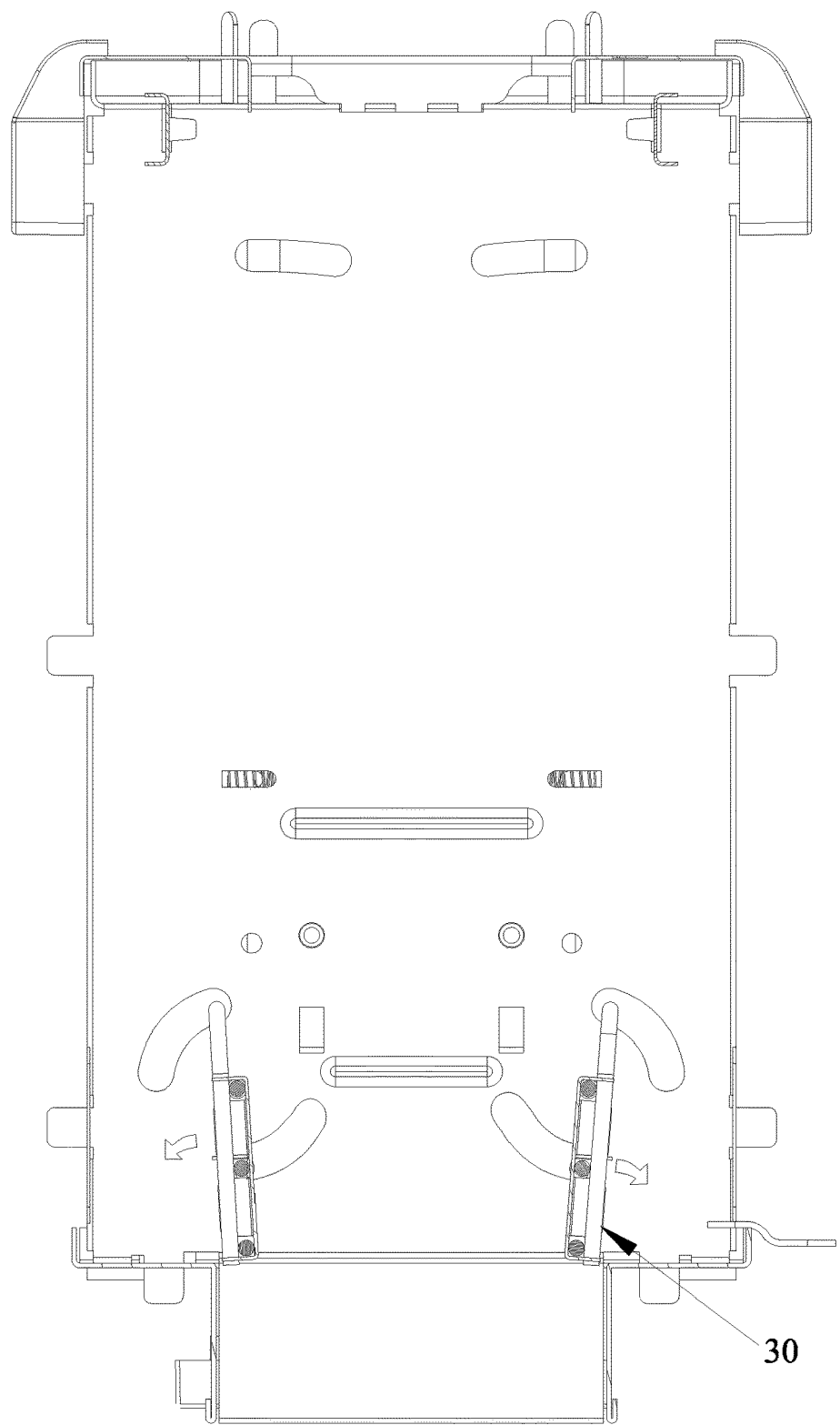
FIG. 18 is a schematic view in accordance with an embodiment of the present invention, showing that the door is opened.

As shown in FIG. 4, the door 30 is a double-opening door. The door locking shaft 31 and the door opening shaft 32 of the door 30 are located at two sides of a door rotation shaft 33, respectively. The door rotation shaft 33 is pivotally connected with two side panels 23 at left and right sides of the toasting chamber 20. The door locking shaft 31 and the door opening shaft 32 are mounted to an arcuate door locking groove 27 and an arcuate door opening groove 28, respectively. As shown in FIG. 11, the door 30 is closed. As shown in FIG. 18, the door 30 is opened.

Figure 13:
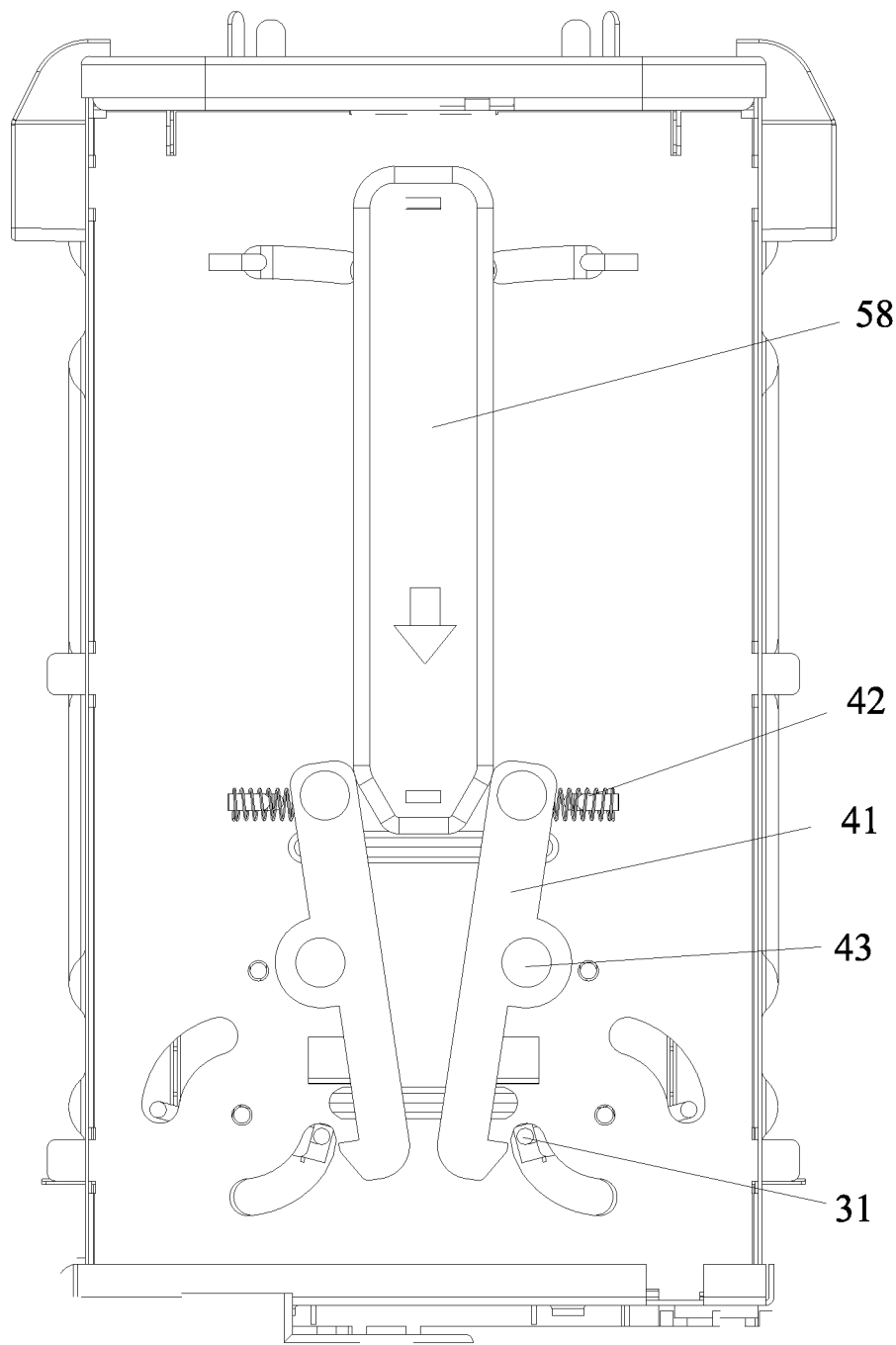
FIG. 13 is a schematic view in accordance with an embodiment of the present invention, showing that the hook support plate is pressed down to rotate the lever hook to disengage from the door locking shaft.

As shown in FIG. 4, the door locking mechanism 40 includes a lever hook 41 and a tension spring 42. An upper end of the lever hook 41 abuts against the tension spring 42. A lower end of the lever hook 41 is formed with a hook for clasping the door locking shaft 31. When the lift door opening mechanism 50 is pressed down, a hook support plate 58 is pressed down to push the top of the lever hook 41 to compress the tension spring 42 so as to rotate the lever hook 41 about a fulcrum 43, so that the hook at the lower end of the lever hook 41 is disengaged from the door locking shaft 31. As shown in FIG. 10, the lever hook 41 is engaged with the door locking shaft 31. As shown in FIG. 13, the lever hook 41 is disengaged from the door locking shaft 31.

Figure 5:
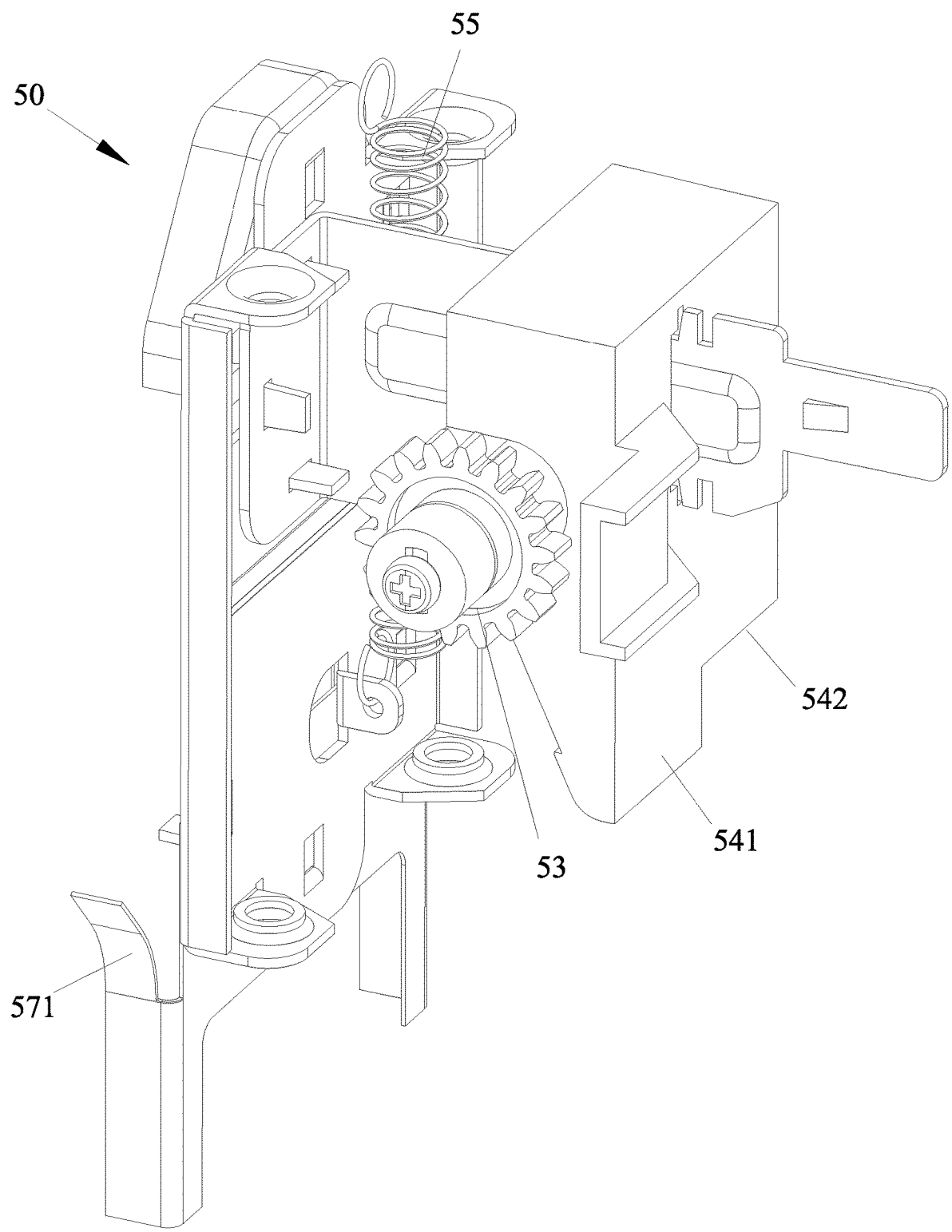
FIG. 5 is a schematic view in accordance with an embodiment of the present invention, showing the lift door opening mechanism.
Figure 6:
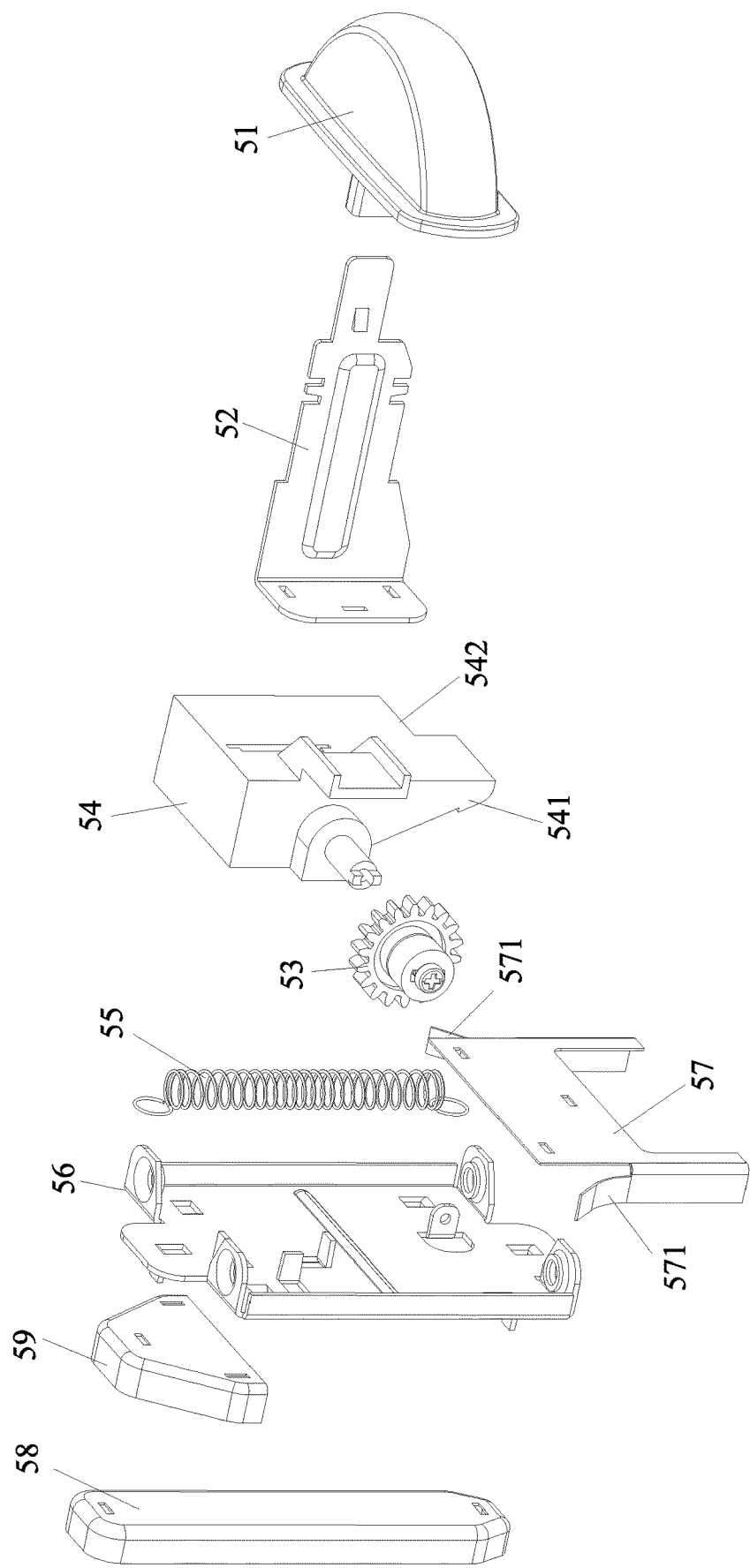
FIG. 6 is an exploded view of FIG. 5.

As shown in FIG. 5 and FIG. 6, the lift door opening mechanism 50 includes a button 51, a button connecting plate 52, a gear 53, a gear seat 54, a return spring 55, a slide seat 56, a leaf spring holder 57, a hook support plate 58, and a hook support plate connecting seat 59. The button 51 is insertedly connected to the button connecting plate 52. The button connecting plate 52 is fixedly connected to an upper end of the slide seat 56. The gear seat 54 is connected to the button connecting plate 52. The gear 53 is mounted on a shaft of the gear seat 54. The gear 53 meshes with a gear rack 26. The bottom of the gear seat 54 is provided with a lift mechanism hook 541 and an actuating block pushing platform 542. A lower end of the return spring 55 is connected to the slide seat 56, and an upper end of the return spring 55 is connected to a top plate 24 of the toasting chamber 20. The slide seat 56 is mounted to two slide rods 25. The leaf spring holder 57 is fixed to a lower end of the slide seat 56. The leaf spring holder 57 has leaf springs 571 at two sides thereof for pushing the door opening shaft 32. The hook support plate 58 is fixedly mounted to the slide seat 56 through the hook support plate connecting seat 59.

Figure 7:
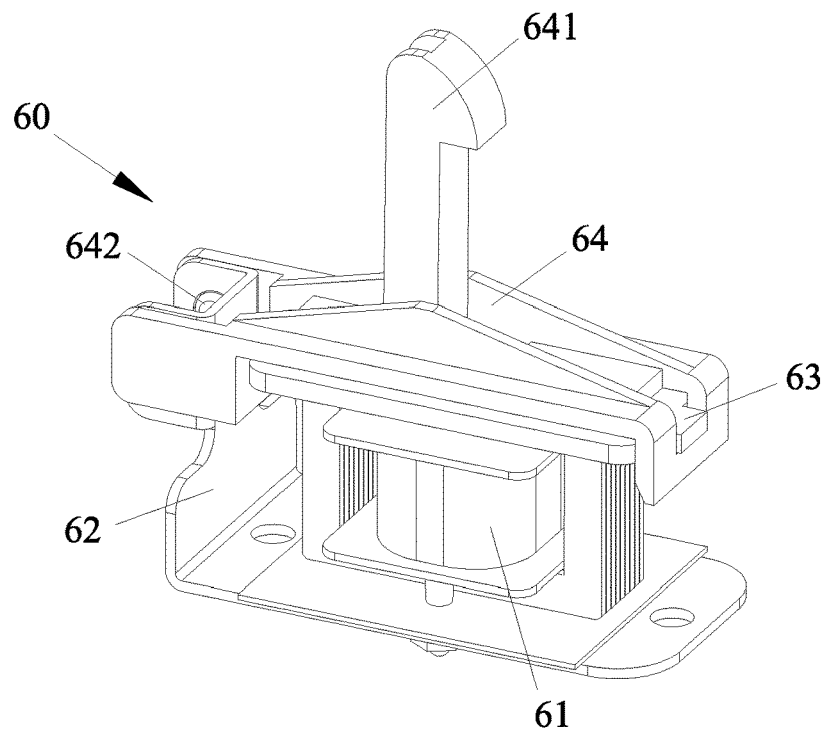
FIG. 7 is a schematic view in accordance with an embodiment of the present invention, showing the magnetic suction mechanism.
Figure 8:
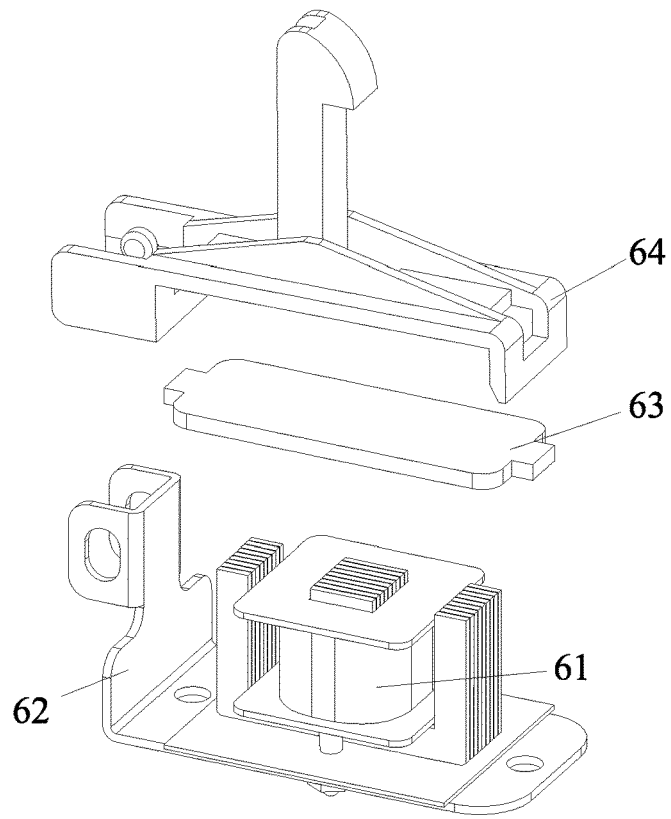
FIG. 8 is an exploded view of FIG. 7.

As shown in FIG. 7 and FIG. 8, the magnetic suction mechanism 60 includes a transformer 61, a transformer retaining seat 62, a magnetic sheet 63, and a magnetic sheet holder 64. The magnetic sheet 63 is mounted to the magnetic sheet holder 64. One side of the magnetic sheet holder 64 is hinged to the transformer retaining seat 62. An upper end of the magnetic sheet holder 64 has a magnetic suction mechanism hook 641. When the magnetic suction mechanism 60 is not energized, the transformer 61 is not engaged with the magnetic sheet 63. The lower end of the lift door opening mechanism is a curved guide surface, and the upper end of the magnetic suction mechanism hook 641 is also a curved guide surface. Therefore, after the lift door opening mechanism 50 is pressed down, the lift mechanism hook 541 pushes the magnetic suction mechanism hook 641, enabling the magnetic sheet holder 64 to be opened about a shaft center point 642 (see FIG. 14) until the lift mechanism hook 541 is engaged with the magnetic suction mechanism hook 641 (see FIG. 16). At this time, the actuating block pushing platform 542 pushes the actuating block 73 down for power on so that the transformer 61 sucks the magnetic sheet 63 tightly for the magnetic suction mechanism hook 641 to engage with the lift mechanism hook 541 and the lift door opening mechanism 50 cannot be returned upward. After the sliced bread is baked, the PCB control board controls the transformer 61 to be de-energized and the lift door opening mechanism 50 is returned by the return spring 55.

As shown in FIG. 3, the power switch mechanism 70 includes a double-pole switch 71, a double-pole switch holder 72, and an actuating block 73. The double-pole switch 71 is mounted on the double-pole switch holder 72. The actuating block 73 elastically extends out of the top of the double-pole switch holder 72. When the lift door opening mechanism 50 is pressed down, the actuating block 73 is touched to connect the power supply.

The process of opening and closing the door 30 of the toaster of the present invention is described hereinafter.

Normally, as shown in FIG. 9, the lift door opening mechanism 50 is located at the upper position of the toaster, not in contact with the magnetic suction mechanism 60 and the power switch mechanism 70. As shown in FIG. 10, the hook support plate 58 of the lift door opening mechanism 50 does not apply a force to the lever hook 41 of the door locking mechanism 40, and the lever hook 41 clasps the door locking shaft 31. As shown in FIG. 11, the door is in a closed state. Thus, the sliced bread is placed in the toaster from the inlet 21, and the closed door 30 allows the sliced bread to remain in the toasting chamber 20 without dropping.

Figure 12:
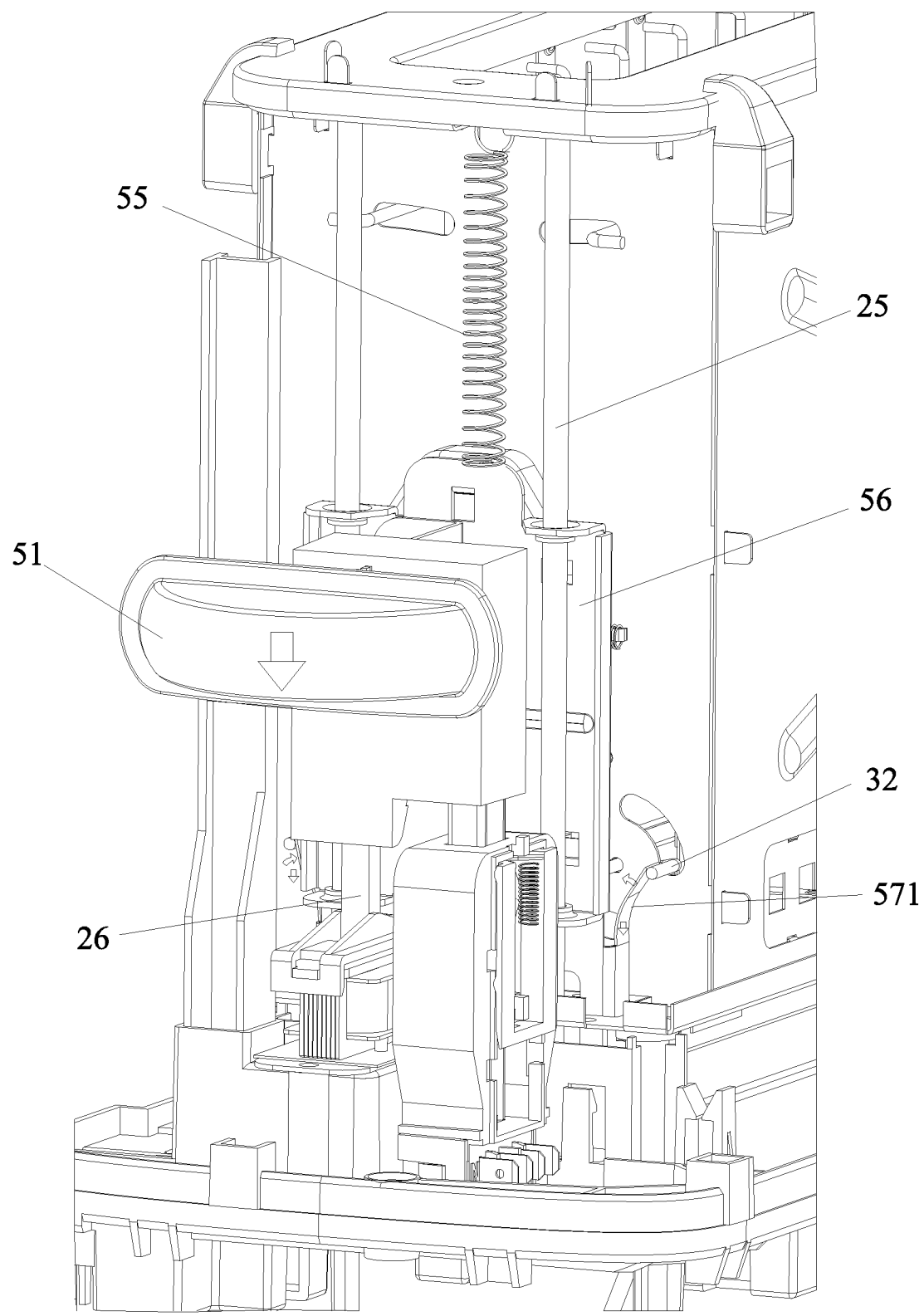
FIG. 12 is a schematic view in accordance with an embodiment of the present invention, showing that the lift door opening mechanism is moved across the door opening shaft when pressed down.
Figure 14:
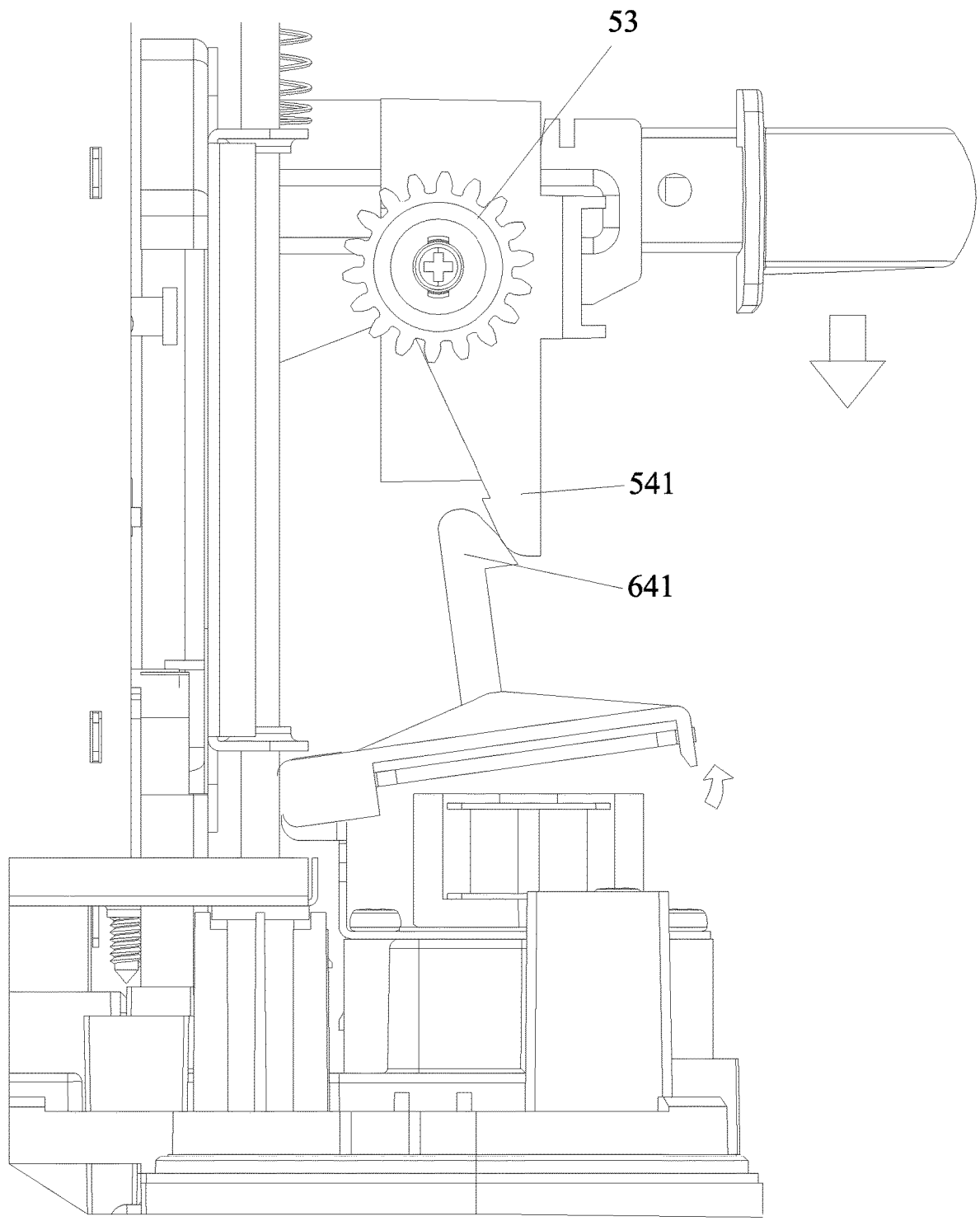
FIG. 14 is a schematic view in accordance with an embodiment of the present invention, showing that the magnetic sheet holder is opened when the lift door opening mechanism is pressed down.
Figure 16:
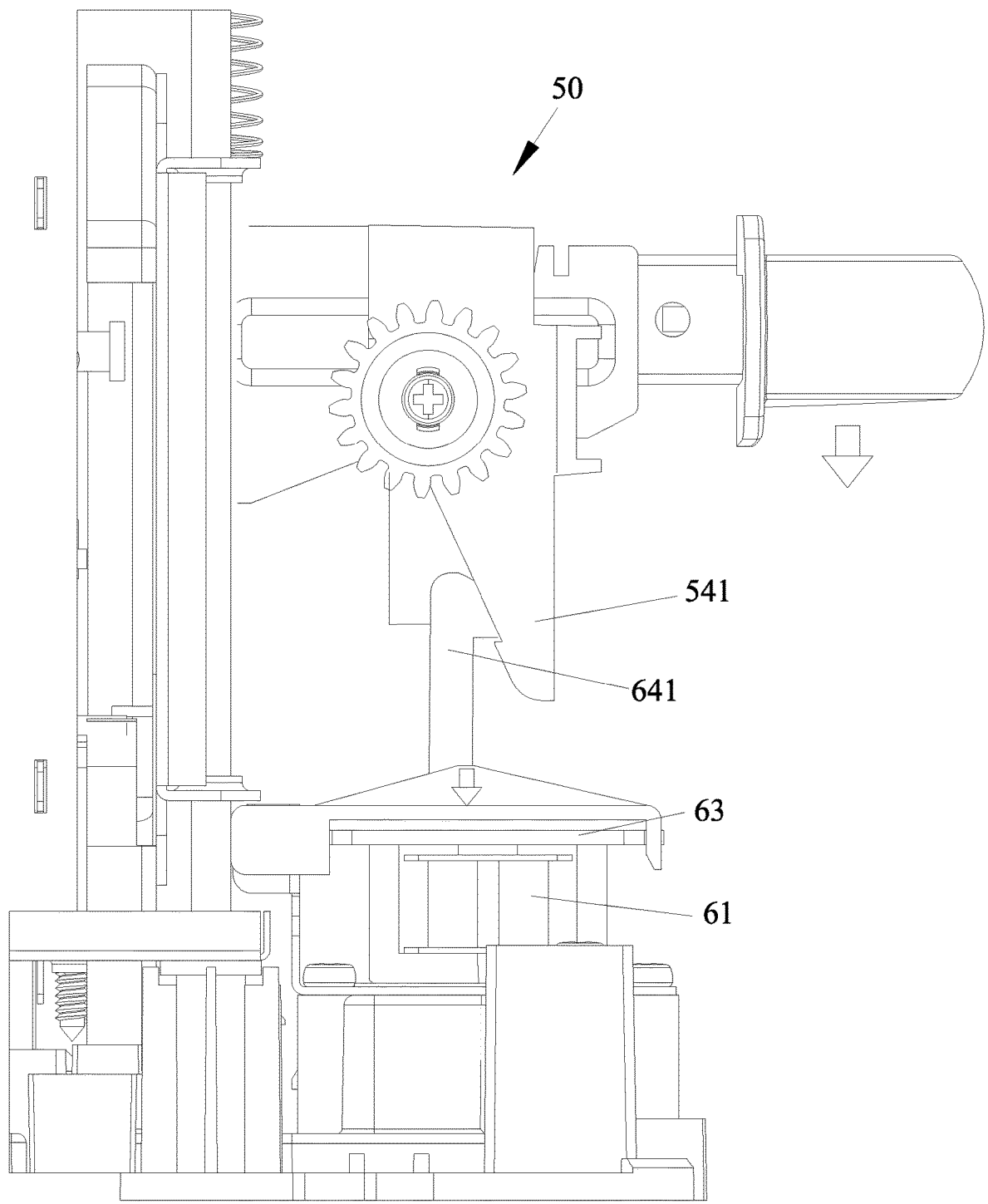
FIG. 16 is a schematic view in accordance with an embodiment of the present invention, showing that the lift door opening mechanism is pressed to the lowermost to be clasped by the magnetic suction mechanism.

As shown in FIG. 12, the button 51 is slowly pressed down for power on. During this process, the return spring 55 is elongated, the gear 53 slides from the upper end to the lower end of the gear rack 26, the slide seat 56 slides from the upper end to the lower end of the slide rod 25, and the leaf spring 571 is inwardly deformed by the elastic action to go across the door opening shaft 32 so that it can smoothly slide to be under the door opening shaft 32. Meanwhile, as shown in FIG. 13, the hook support plate 58 slides down to get contact with the lever hook 41 and compress the tension spring 42 so that the lever hook 41 is rotated about the fulcrum 43 to disengage from the door locking shaft 31. Meanwhile, as shown in FIG. 14, the curved guide surface at the bottom of the lift mechanism hook 541 touches the magnetic suction mechanism hook 641 to open the magnetic sheet holder 64. As shown in FIG. 15, when the button 51 is pressed to the lowermost, the actuating block pushing platform 542 contacts the actuating block 73 for power on to toast the bread. Meanwhile, as shown in FIG. 16, after the power is turned on, the transformer 61 is energized to suck the magnetic sheet 63 so that the lift mechanism hook 541 is engaged with the magnetic suction mechanism hook 641 and the magnetic suction mechanism hook 641 pulls the lift door opening mechanism 50 not to rise.

Figure 19:
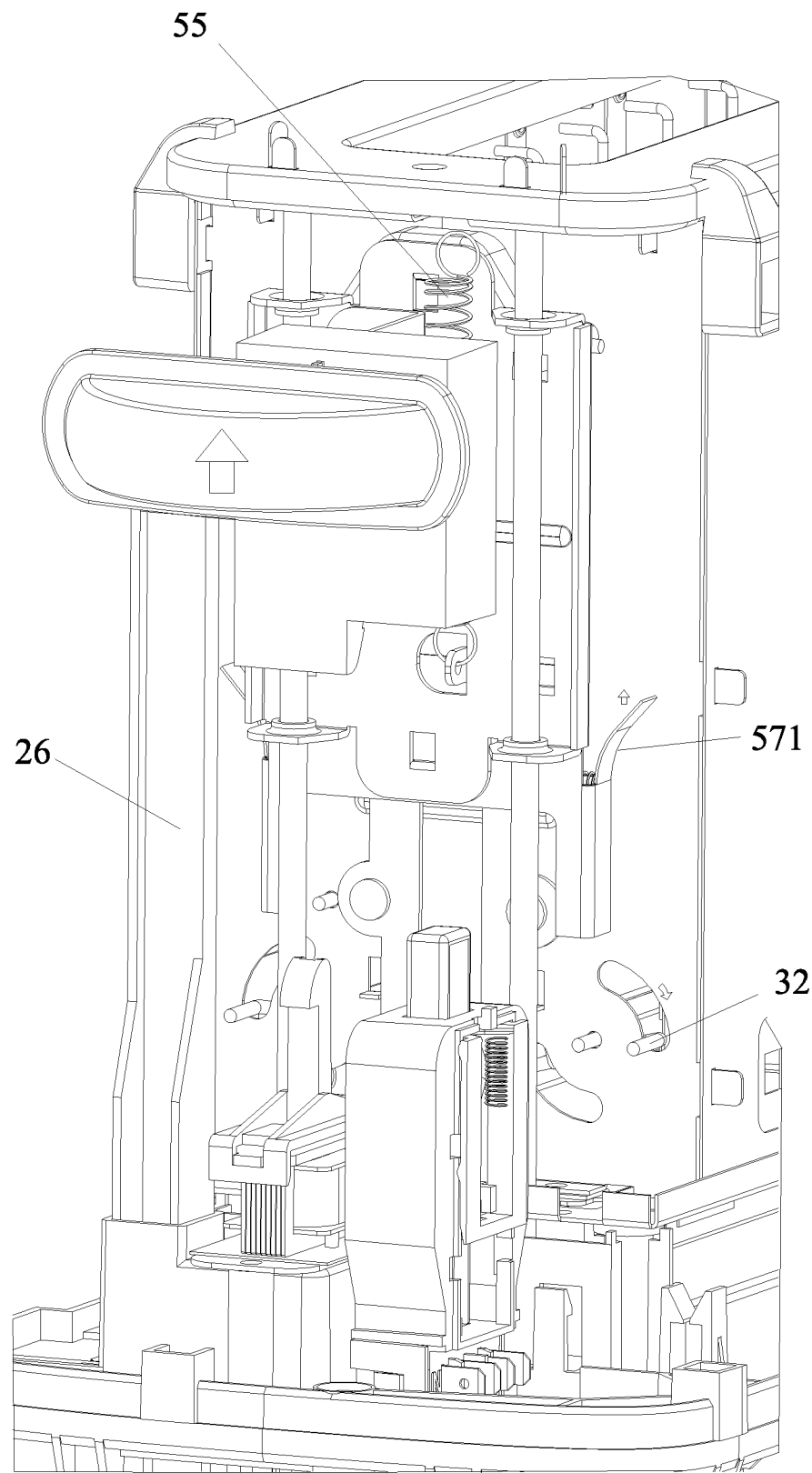
FIG. 19 is a schematic view in accordance with an embodiment of the present invention, showing that the gear is moved on the gear rack after the door is opened.

As shown in FIG. 17, after the baking of the bread is finished, the PCB control board controls the transformer to be de-energized, and the lift mechanism hook 541 is disengaged from the magnetic suction mechanism hook 641, and the lift door opening mechanism 50 is returned by the return spring 55. During the rising of the lift door opening mechanism 50, the door opening shaft 32 is rotated counterclockwise by the leaf spring 571 to open the door 30 (see FIG. 18), and the crumbs drops on the bread tray 11. At this time, as shown in FIG. 19, the gear 53 and the gear rack 26 function as a delay to close the door 30, and the lift door opening mechanism 50 continues to rise, the door opening shaft 32 is disengaged from the leaf spring 571, and the hook support plate 58 rises, so that the lever hook 41 is returned and the door 30 is closed by the action of the tension spring 42 to complete a work cycle.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A toaster, comprises a housing having a toasting chamber disposed in the housing, an upper end of the toasting chamber having an inlet for feeding sliced bread, a lower end of the toasting chamber having an outlet for discharging the sliced bread; characterized by: the outlet being provided with a door for opening and closing the outlet, the door being driven by a door opening structure, the door opening structure including a door locking mechanism, a lift door opening mechanism, a magnetic suction mechanism, a power switch mechanism, and a PCB control board, the lift door opening mechanism being slidably mounted on an outside of the toasting chamber, the magnetic suction mechanism and the power switch mechanism being located under the lift door opening mechanism, the PCB control board being electrically connected with the magnetic suction mechanism; wherein when the lift door opening mechanism is pressed down, the door locking mechanism is disengaged from a door locking shaft and the power switch mechanism is activated for energizing, the magnetic suction mechanism is energized to engage with the lift door opening mechanism until the baking of the sliced bread is finished, and the PCB control board controls the magnetic suction mechanism to be de-energized when the lift door opening mechanism automatically rises to pull a door opening shaft to open the door.

2. The toaster as claimed in claim 1, wherein the door is a double-opening door, the door locking shaft and the door opening shaft of the door are located at two sides of a door rotation shaft respectively, the door rotation shaft is pivotally connected with two side panels at two sides of the toasting chamber, the door locking shaft and the door opening shaft are mounted to an arcuate door locking groove and an arcuate door opening groove, respectively.

3. The toaster as claimed in claim 1, wherein the door locking mechanism includes a lever hook and a tension spring, an upper end of the lever hook abuts against the tension spring, when the door is closed, a hook formed at a lower end of the lever hook clasps the door locking shaft; when the lift door opening mechanism is pressed down, a hook support plate is pressed down to push a top of the lever hook to compress the tension spring so as to rotate the lever hook about a fulcrum, so that the hook at the lower end of the lever hook is disengaged from the door locking shaft.

4. The toaster as claimed in claim 1, wherein the lift door opening mechanism includes a button, a button connecting plate, a gear, a gear seat, a return spring, a slide seat, a leaf spring holder, a hook support plate, and a hook support plate connecting seat; the button is insertedly connected to the button connecting plate, the button connecting plate is fixedly connected to an upper end of the slide seat, the gear seat is connected to the button connecting plate, the gear is mounted on a shaft of the gear seat and meshes with a gear rack, a bottom of the gear seat being provided with a lift mechanism hook and an actuating block pushing platform; a lower end of the return spring is connected to the slide seat, an upper end of the return spring is connected to a top plate of the toasting chamber, the slide seat is mounted to two slide rods, the leaf spring holder is fixed to a lower end of the slide seat, the leaf spring holder has leaf springs at two sides thereof for pushing the door opening shaft, and the hook support plate is fixedly mounted to the slide seat through the hook support plate connecting seat.

5. The toaster as claimed in claim 1, wherein the magnetic suction mechanism includes a transformer, a transformer retaining seat, a magnetic sheet, and a magnetic sheet holder, the magnetic sheet is mounted to the magnetic sheet holder, one side of the magnetic sheet holder is hinged to the transformer retaining seat, and an upper end of the magnetic sheet holder has a magnetic suction mechanism hook.

6. The toaster as claimed in claim 1, wherein the power switch mechanism includes a double-pole switch, a double-pole switch holder, and an actuating block, the double-pole switch is mounted on the double-pole switch holder, the actuating block elastically extends out of a top of the double-pole switch holder.

7. The toaster as claimed in claim 1, wherein a front side of the housing is rotatably mounted with a bread tray, and the bread tray is connected with the outlet of the toasting chamber through a guide plate.

8. The toaster as claimed in claim 1, wherein the PCB control board is electrically connected with a timer knob disposed on a front surface of the housing.

\* \* \* \* \*